(12) United States Patent
Ogaki et al.

(10) Patent No.: US 8,317,081 B2
(45) Date of Patent: Nov. 27, 2012

(54) REFLOW BONDING METHOD AND METHOD OF MANUFACTURING HEAD SUSPENSION

(75) Inventors: Shogo Ogaki, Aikoh-gun (JP); Takashi Ando, Aikoh-gun (JP); Masaru Inoue, Aikoh-gun (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 12/907,406

(22) Filed: Oct. 19, 2010

(65) Prior Publication Data

US 2011/0101076 A1   May 5, 2011

(30) Foreign Application Priority Data

Oct. 30, 2009 (JP) ................. P2009-250239

(51) Int. Cl.
  *B23K 31/02* (2006.01)
(52) U.S. Cl. ............... 228/262.42; 228/244; 228/251; 228/262.41
(58) Field of Classification Search ........... 228/244, 228/251, 262.41, 262.42
See application file for complete search history.

(56) References Cited

U.S. PATENT DOCUMENTS

2009/0080111 A1* 3/2009 Yao et al. ............ 360/234.5

FOREIGN PATENT DOCUMENTS

| JP | 2001049449 A | * | 2/2001 |
| JP | 2005125349 A | * | 5/2005 |
| JP | 2006-315043 | | 11/2006 |
| JP | 2009-010300 | | 1/2009 |

* cited by examiner

*Primary Examiner* — Nicholas D'Aniello
(74) *Attorney, Agent, or Firm* — Jordan and Hamburg LLP

(57) ABSTRACT

A reflow bonding method easily bonds first and second wiring members together by reflowing solder arranged on at least one of first and second bonding parts that are defined on the first and second wiring members, respectively. The method includes positioning the first and second wiring members so that the first and second bonding parts face each other with the solder interposed between them and heating and pressing one of the first and second bonding parts from behind with a pressing face of a heater chip so that the first and second bonding parts lie one on another and so that the solder is heated and reflows to bond the first and second wiring members together.

6 Claims, 3 Drawing Sheets

Positioning step

Heating step

Fig.2A Positioning step
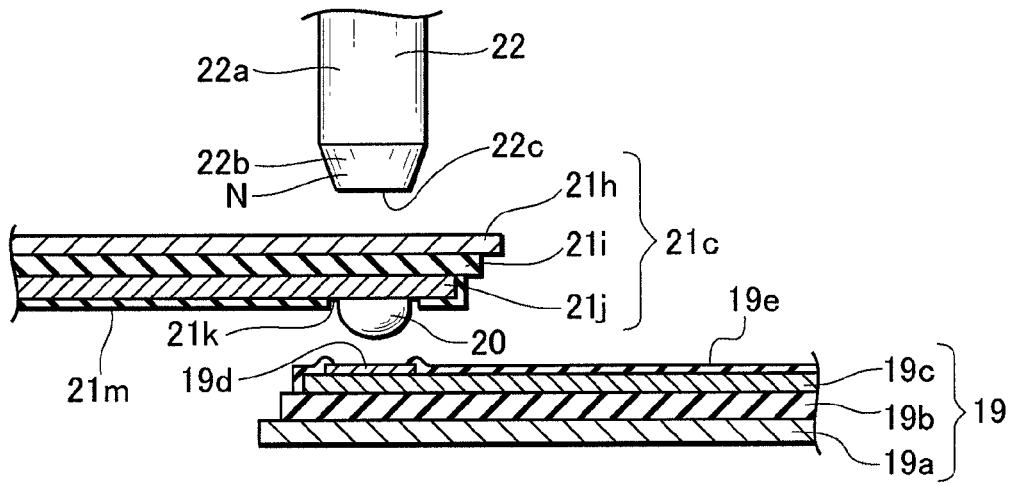
Fig.2B Heating step
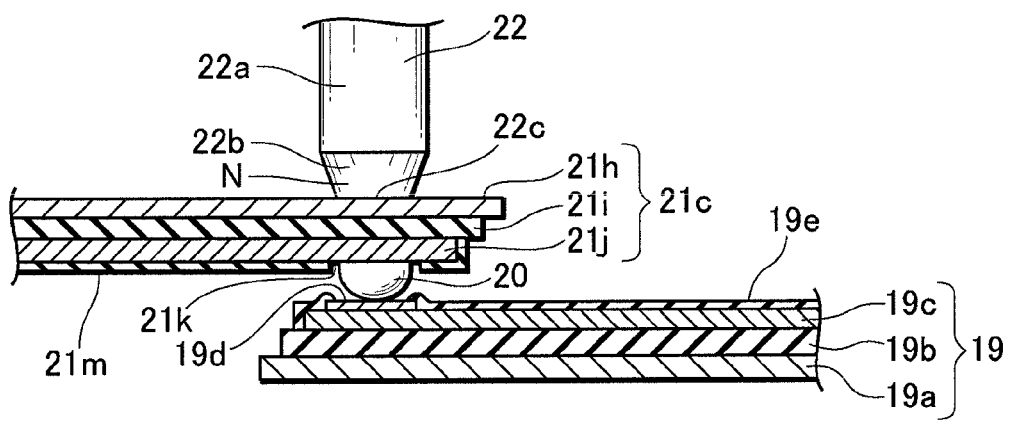
Fig.2C Completion of reflow bonding
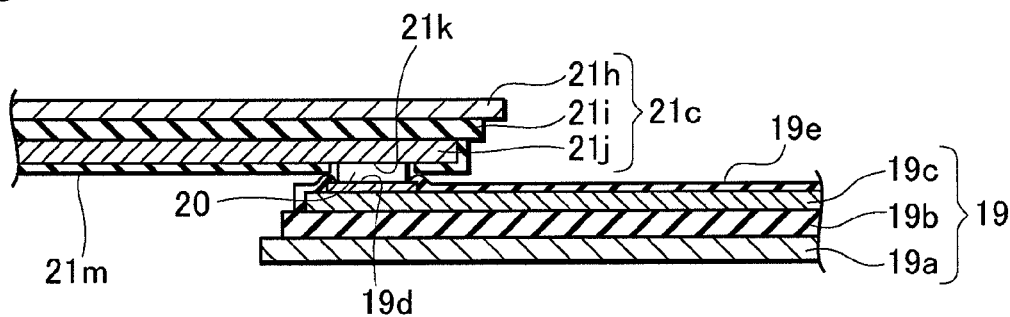

US 8,317,081 B2

REFLOW BONDING METHOD AND METHOD OF MANUFACTURING HEAD SUSPENSION

BACKGROUND OF THE INVENTION

1. Field of the Invention

The present invention relates to a method of easily jointing wiring members together by reflow bonding and a method of manufacturing a head suspension with the use of the reflow bonding.

2. Description of Related Art

The reflow bonding employs, for example, solder to join parts such as electronic wiring members together.

The reflow bonding is carried out by arranging a first wiring member plated with solder, laying a second wiring member on the first wiring member, melting the plated solder with heat, and solidifying the molten solder to bond the first and second wiring members together.

Heat used for the reflow bonding may be radiant heat radiated from a high-temperature furnace as disclosed in Japanese Unexamined Patent Application Publication No. 2009-10300, Joule heat generated by passing a current to a heater chip as disclosed in Japanese Unexamined Patent Application Publication No. 2006-315043, or the like.

There is a need of simply carrying out the reflow bonding to join wiring members together.

This need is not met by the Japanese Unexamined Patent Application Publication No. 2009-10300 because it uses a large reflow furnace.

The Japanese Unexamined Patent Application Publication No. 2006-315043 is also unable to satisfy the need because it employs expensive facility such as a pulse heat power source to pass a current to the heater chip.

SUMMARY OF THE INVENTION

An object of the present invention is to provide a reflow bonding method capable of easily joining wiring members together. Another object of the present invention is to provide a method of manufacturing a head suspension with the use of the reflow bonding method.

In order to accomplish the objects, an aspect of the present invention provides a reflow bonding method of bonding first and second bonding parts together by reflowing solder arranged on at least one of the first and second bonding parts, the first and second bonding parts defined on first and second wiring members, respectively. The method includes positioning the first and second wiring members so that the first and second bonding parts face each other with the solder interposed between them and heating and pressing one of the first and second bonding parts from behind with a pressing face of a heater chip so that the first and second bonding parts lie one on another and so that the solder is heated and reflows to bond the first and second wiring members together.

This aspect heats and presses the first bonding part from behind with the pressing face of the heater chip, to reflow (melt and solidify) the solder, thereby easily bonding the first and second wiring members together.

According to this aspect, the heater chip to heat and press the first bonding part from behind has the nickel-film-coated pressing face. The nickel film protects the heater chip, which is not in contact with the solder, from oxidization damage. The heater chip, therefore, can keep proper heat conductivity to easily and correctly carry out the reflow bonding. In addition, the heater chip can maintain the shape thereof, to secure a contact area with respect to an object and elongate the service life of its own.

BRIEF DESCRIPTION OF THE DRAWINGS

FIGS. 2A to 2C are sectional views taken along a line II-II of FIG. 1, illustrating a reflow bonding method according to an embodiment of the present invention.

DETAILED DESCRIPTION OF EMBODIMENTS

A reflow bonding method and a method of manufacturing a head suspension according to embodiments of the present invention will be explained with reference to the drawings. The reflow bonding method according to the present invention easily carries out the reflow bonding of first and second wiring members by positioning the first and second wiring members so that first and second bonding parts of the first and second wiring members face each other with solder interposed between them and by heating and pressing one of the first and second bonding parts from behind with a heater chip having a pressing face coated with a nickel film.

Figure 1:
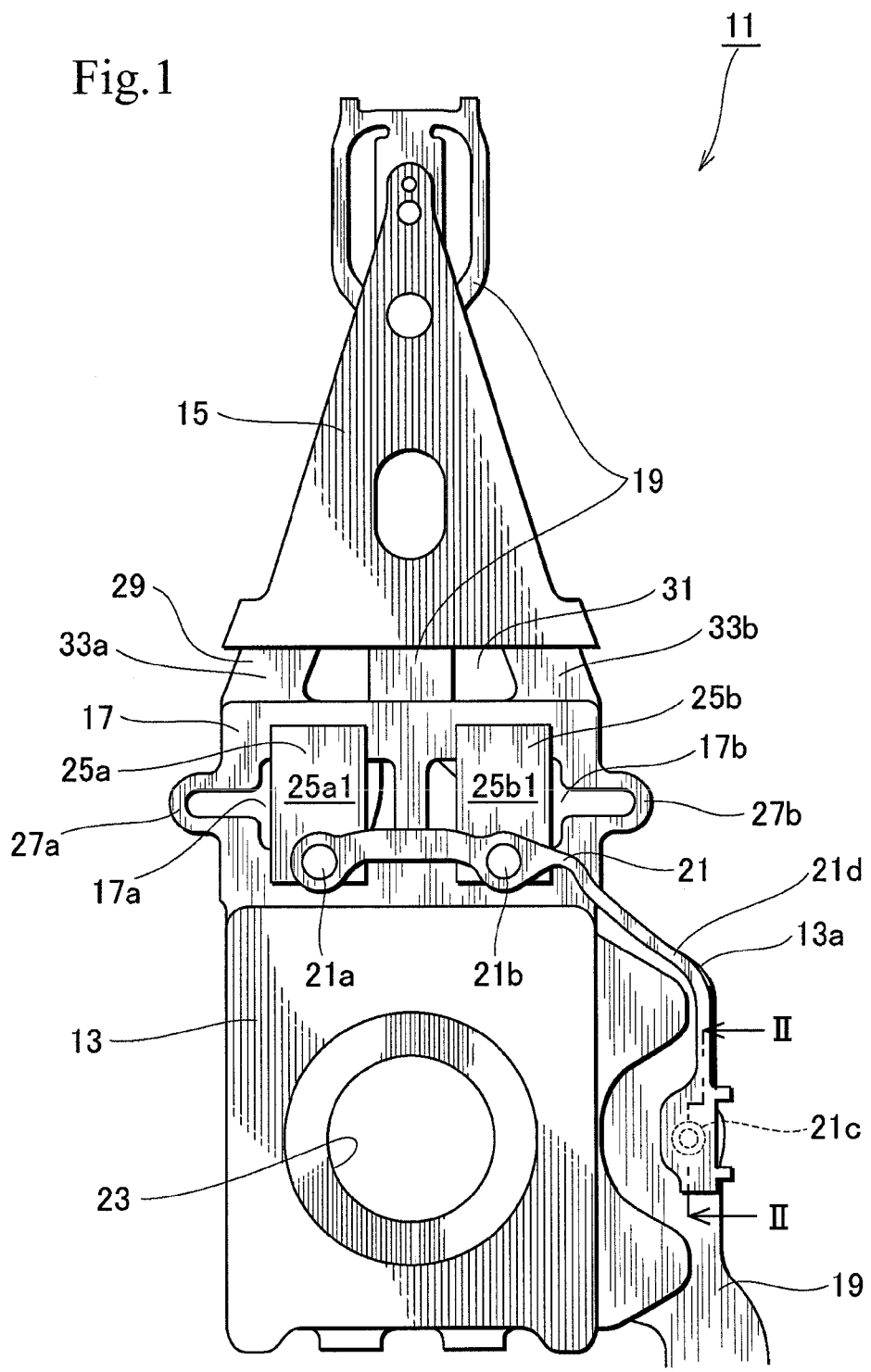
FIG. 1 is a plan view illustrating a head suspension manufactured according to an embodiment of the present invention.

First, the head suspension to be manufactured according to the present invention will be explained. FIG. 1 is a plan view illustrating the head suspension 11 and FIGS. 2A to 2C are sectional views taken along a line II-II of FIG. 1, illustrating the head suspension 11 during the reflow bonding method of the present invention. FIG. 2A illustrates a positioning step of the reflow bonding method, FIG. 2B a heating step of the method, and FIG. 2C a completion state of the method.

The head suspension 11 is used in a magnetic disk drive (not illustrated), to write and read data to and from a magnetic disk arranged in the drive. In FIG. 1, the head suspension 11 has a base plate 13, a load beam 15, an actuator base 17, a flexure 19, a jumper 21, piezoelectric elements 25a and 25b, and other elements.

The head suspension 11 has a function of displacing the load beam 15 relative to the base plate 13 in response to power applied to the piezoelectric elements 25a and 25b.

The base plate 13 resiliently supports, through the actuator base 17, the load beam 15. The base plate 13 is made of a thin metal plate such as a stainless steel plate having a thickness of, for example, about 150 to 200 µm.

The base plate 13 has a circular boss 23. With the boss 23, the base plate 13 is attached to a front end of an actuator arm (not illustrated) and is turned by a voice coil motor (not illustrated).

The load beam 15 applies load onto a magnetic head slider (not illustrated). The load beam 15 is a resilient metal thin plate made of, for example, stainless steel and has a thickness of, for example, about 50 to 150 µm.

The actuator base 17 is interposed between the base plate 13 and the load beam 15. To the actuator base 17, the piezoelectric elements 25a and 25b are attached. The piezoelectric elements 25a and 25b deform in a compressive manner when receiving electric power. The piezoelectric elements 25a and 25b are attached to the actuator base 17 across openings 17a and 17b formed in the actuator base 17.

One side of the opening 17a (17b) of the actuator base 17 is provided with a flexible link 27a (27b) outwardly protruding in a U-shape. The flexible links 27a and 27b improve the rigidity of the actuator base 17 to which the piezoelectric elements 25a and 25b are attached and smooth displacement strokes of the piezoelectric elements 25a and 25b when moving the load beam 15 in a sway direction.

The actuator base 17 is separately prepared from the base plate 13 and is fixed thereto by, for example, laser spot welding. The assembly of the base plate 13 and actuator base 17 corresponds to a base to which the load beam 15 is connected.

The actuator base 17 may be integral with the base plate 13. In this case, the integral body of the actuator base 17 and base plate 13 corresponds to the base.

A rear end of the load beam 15 is integral with a connection plate 29. The connection plate 29 is a metal thin plate such as a stainless steel thin plate having a thickness of, for example, about 30 μm.

The connection plate 29 has a hole 31 to reduce the thickness-direction rigidity and weight of the head suspension 11. Each side of the hole 31 is a hinge 33a (33b) bendable in a thickness direction.

A rear end of the connection plate 29, i.e., a base end of the load beam 15 is laid on the back of a front end of the actuator base 17 and is fixed thereto by, for example, laser spot welding.

The flexure 19 arranged on the load beam 15 transmits input/output signals and electric power to functional parts such as the magnetic head slider and piezoelectric elements 25a and 25b. The flexure 19 extends along a side of the base plate 13 up to a front end of the load beam 15.

As illustrated in FIGS. 2A to 2C, the flexure 19 as a first wiring member has a first metal base 19a. The first metal base 19a is thinner than the load beam 15 and is precisely made from, for example, resilient stainless steel having a thickness of, for example, about 10 to 30 μm. On the first metal base 19a, a first insulating layer 19b is formed, and on the first insulating layer 19b, a first conductor layer 19c is formed. The first insulating layer 19b is made of, for example, polyimide resin and has a thickness of about 5 to 15 μm. The first conductor layer 19c is used to transmit input/output signals and electric power. The first conductor layer 19c is made of, for example, copper (Cu) and has a thickness of about 5 to 15 μm.

The first conductor layer 19c has a first circular bonding part 19d as a first bonding part. The first bonding part 19d is made of a material having a low electric contact resistance, such as gold (Au). The first conductor layer 19c also has a first insulating cover layer 19e made of, for example, polyimide resin to cover the first conductor layer 19c except the first bonding part 19d. Namely, the first bonding part 19d is exposed to the outside.

The jumper 21 as a second wiring member electrically connects the piezoelectric elements 25a and 25b, which are spaced from each other by a predetermined distance, to the flexure 19.

The jumper 21 has piezoelectric element connecting parts 21a and 21b at a first end, a wiring connecting part 21c at a second end, and an intermediate part 21d between the first and second ends.

As illustrated in FIG. 1, the piezoelectric element connecting parts 21a and 21b are electrically connected through a conductive adhesive (not illustrated) to electrodes 25a1 and 25b1 of the piezoelectric elements 25a and 25b, respectively. Electrodes (not illustrated) of the piezoelectric elements 25a and 25b opposite to the electrodes 25a1 and 25b1 are electrically connected (grounded) through, for example, a conductive adhesive (not illustrated) to the actuator base 17.

The intermediate part 21d is curved and extends from the piezoelectric elements connecting parts 21a and 21b to the wiring connecting part 21c along an edge 13a of the base plate 13.

As illustrated in FIGS. 1 and 2C, the wiring connecting part 21c is electrically connected to the bonding part 19d of the flexure 19 with solder.

The wiring connecting part 21c has a second metal base 21h. The second metal base 21h is thinner than the load beam 15, is accurately formed, has resiliency, and is made of, for example, stainless steel. On the second metal base 21h, a second insulating layer 21i is formed, and on the second insulating layer 21i, a second conductor layer 21j is formed.

The second insulating layer 21i is made of, for example, polyimide resin. The second conductor layer 21j is made of, for example, copper (Cu) and transmits input/output signals and electric power.

The second conductor layer 21j has a second circular bonding part 21k as a second bonding part. The second conductor layer 21j also has a second insulating cover layer 21m. The second insulating cover layer 21m is made of, for example, polyimide resin and covers the second conductor layer 21j except the second bonding part 21k. Namely, the second bonding part 21k is exposed to the outside.

The second bonding part 21k is electrically connected to the first bonding part 19d of the flexure 19 with solder.

The jumper 21 of the above-mentioned configuration secures the degree of freedom of power supply to the piezoelectric elements 25a and 25b.

The reflow bonding method of the embodiment illustrated in FIGS. 2A to 2C will be explained in detail with reference also to FIG. 3 that illustrates a heater chip 22 and a solder bump 20.

Next, the reflow bonding method carries out a positioning step illustrated in FIG. 2A and a heating step illustrated in FIG. 2B.

The positioning step of FIG. 2A positions the first bonding part 19d of the first conductor layer 19c of the flexure 19 and the second bonding part 21k of the second conductor layer 21j of the jumper 21, so that they face each other. At this time, the solder bump 20 comes between the bonding parts 19d and 21k, the solder bump 20 being formed on at least one of the bonding parts 19d and 21k.

According to the embodiment, the solder bump 20 is hemispherically formed on the second bonding part 21k in advance. The shape of the solder bump 20 is not limited to hemisphere. According to the present invention, the solder bump 20 may have any shape. The solder bump 20 is made of lead-free solder.

In the positioning step, the heater chip 22 provided with a heat source is in a standby state because it is used in the heating step.

Figure 3:
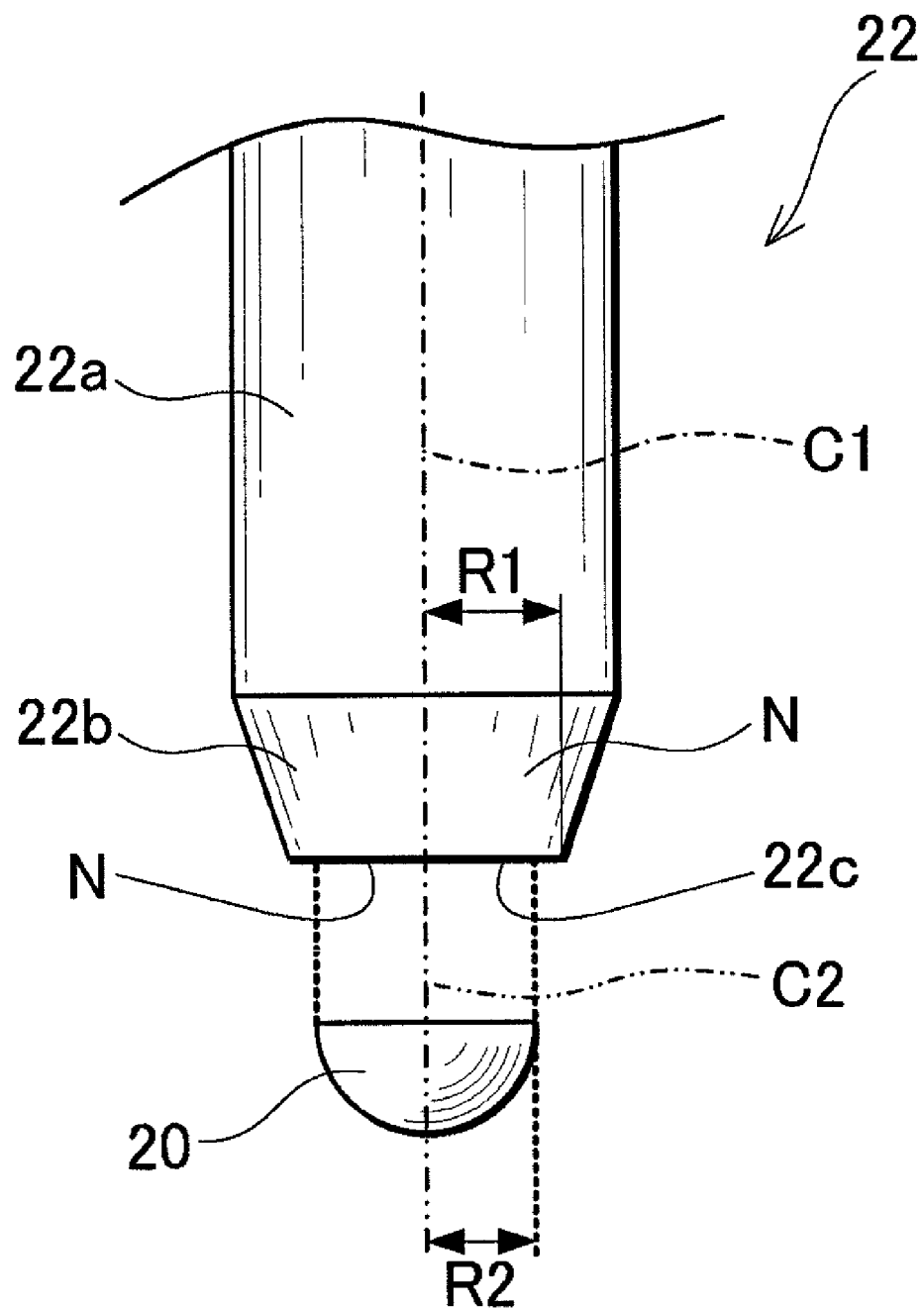
FIG. 3 is a schematic view illustrating a heater chip and a solder bump used by the reflow bonding method of FIG. 2.

In FIG. 3, the heater chip 22 is made of a material having a good heat conductivity, such as copper (Cu) or a copper alloy. The heater chip 22 includes a base 22a, a front end 22b, and a pressing face 22c. The base 22a has a cylindrical section. The front end 22b has a truncated conical shape. The pressing face 22c is circular flat and is formed at a tip of the front end 22b along a direction orthogonal to an axis of the base 22a. A circumferential edge of the pressing face 22c is chamfered.

In the positioning step, the heater chip 22 is positioned so that a center axis C1 of the pressing face 22c agrees with a center axis C2 of the solder bump 20.

A radius R1 of the pressing face 22c of the heater chip 22 is equal to or larger than a radius R2 of the solder bump 20, so that heat of the heater chip 22 is surely conducted to the solder bump 20.

The heat source of the heater chip 22 may be any proper heat source such as a nichrome heater and a ceramics heater.

The heater chip 22 is coated with a nickel film N over at least the pressing face 22c, or preferably over the front end 22b and pressing face 22c. The thickness of the nickel film N is, for example, about 1 to 10 μm.

The nickel film N is preferably a film of electroless nickel (Ni—P) having a micro-Vickers hardness of about 500 Hv. Alternatively, the nickel film N may be a composite plated film of electroless nickel (Ni—P) with dispersed fluororesin particles.

The heating step of FIG. 2B heats and presses one of the first and second bonding parts 19d and 21k from behind with the heater chip 22. In the example of FIG. 2B, the second bonding part 21k having the solder bump 20 is heated and pressed from behind with the heater chip 22.

Namely, the jumper 21 (wiring connecting part 21c) is pressed toward the flexure 19 (the first wiring member) with the heater chip 22 heating and pressing the second metal base 21h on the back of the second bonding part 21k. At this time, the first and second bonding parts 19d and 21k are overlapped so that the solder bump 20 is heated and melts (reflows).

After the heating process, the molten solder bump 20 solidifies to bond the first and second bonding parts 19d and 21k of the flexure 19 and jumper 21 together, as illustrated in FIG. 2C.

In this way, the reflow bonding method according to the embodiment executes the positioning step and heating step. The heating step heats and presses one of the first and second bonding parts 19d and 21k (the second bonding part 21k in the example of FIG. 2B) from behind with the heater chip 22, to reflow (melt and solidify) the solder bump 20 to join the first and second bonding parts 19d and 21k together, thereby easily bonding the flexure 19 and jumper 21, i.e., the first and second wiring members to each other.

According to the embodiment, the heater chip 22 has the pressing face 22c coated with the nickel film N. The nickel film N protects the heater chip 22, which is not in contact with the solder bump 20, from oxidization damage. The heater chip 22, therefore, keeps good heat conductivity to easily and surely bond the first and second wiring members 19 and 21 together by reflowing the solder bump 20. Since the shape of the heater chip 22 is stabilized with the nickel film N, a contact area thereof with a work is constant and the service life thereof is elongated.

According to the embodiment, the nickel film N may be a film of electroless nickel (Ni—P) that excellently protects the heater chip 22 from oxidization damage. Then, the heater chip 22 keeps good heat conductivity to easily and surely bond the first and second wiring members 19 and 21 together by reflowing the solder bump 20. The electroless nickel film further elongates the service life of the heater chip 22.

According to the embodiment, the nickel film N may be a composite plated film of electroless nickel (Ni—P) with dispersed fluororesin particles. This film improves lubrication between the pressing face 22c of the heater chip 22 and the second metal base 21h on the back of the second bonding part 21k, compared with a normal electroless nickel film. With the composite plated film, the heater chip 22 properly presses the second wiring member 21 to the first wiring member 19 and reflows the solder bump 20 to surely joint the wiring members 19 and 21 together without damaging the product (jumper 21).

Next, a method of manufacturing the head suspension 11 (FIG. 1) according to an embodiment of the present invention will be explained. This manufacturing method employs the reflow bonding method explained above.

The head suspension manufacturing method employs the reflow bonding method to complete the head suspension 11.

More precisely, the positioning step of FIG. 2A positions the first bonding part 19d of the flexure 19 and the second bonding part 21k of the jumper 21, so that they face each other with the solder bump 20 of the second bonding part 21k interposed between the bonding parts 19d and 21k.

The heating step of FIG. 2B heats and presses one of the first and second bonding parts 19d and 21k (the second bonding part 21k having the solder bump 20 in the example of FIG. 2B) from behind with the heater chip 22. As a result, the jumper 21 (wiring connecting part 21c) is pressed to the flexure 19 (the first wiring member) with the heater chip 22 heating and pressing the second metal base 21h on the back of the second bonding part 21k. At this time, the first and second bonding parts 19d and 21k are overlapped so that the solder bump 20 is heated and melts (reflows).

After the heating process, the molten solder bump 20 solidifies to bond the first and second bonding parts 19d and 21k of the flexure 19 and jumper 21 (first and second wiring members) together as illustrated in FIG. 2C, thereby completing the head suspension 11. The heater chip 22 used in the heating step has the pressing face 22c that is coated with a film of electroless nickel (Ni—P) having a micro-Vickers hardness of about 500 Hv.

According to this embodiment, the heating step heats and presses the second bonding part 21k from behind with the heater chip 22, to reflow (melt and solidify) the solder bump 20 to join the first and second bonding parts 19d and 21k together, thereby easily fixing the flexure 19 and jumper 21 to each other to manufacture the head suspension 11.

According to the embodiment, the heater chip 22 having the pressing face 22c coated with the nickel film N is used to heat and press the second bonding part 21k from behind. The nickel film N protects the heater chip 22, which is not in contact with the solder bump 20, from oxidization damage. The heater chip 22, therefore, keeps good heat conductivity to easily and surely bond the flexure 19 and jumper 21 (wiring connecting part 21c) together by reflowing the solder bump 20 and manufacture the head suspension 11.

According to the embodiment, the nickel film N is a film of electroless nickel (Ni—P) that excellently protects the heater chip 22 from oxidization damage. The heater chip 22, therefore, keeps good heat conductivity to easily and surely bond the flexure 19 and jumper 21 (wiring connecting part 21c) together by reflowing the solder bump 20 and manufacture the head suspension 11.

According to the embodiment, the nickel film N may be a composite plated film of electroless nickel (Ni—P) with dispersed fluororesin particles. This film improves lubrication between the pressing face 22c of the heater chip 22 and the second metal base 21h on the back of the second bonding part 21k, compared with a normal electroless nickel film. With the composite plated film, the heater chip 22 properly presses the jumper 21 (wiring connecting part 21c) to the flexure 19 and reflows the solder bump 20 to surely bond the flexure 19 and jumper 21 together and manufacture the head suspension 11 without damaging the jumper 21 or the head suspension 11.

According to the embodiment, the nickel film N is a film of electroless nickel (Ni—P) having a micro-Vickers hardness of about 500 Hv and the second metal base 21h is made of stainless steel having a micro-Vickers hardness of about 450 Hv. Namely, the hardness of the nickel film N (about 500 Hv) is nearly equal to that of the stainless-steel base 21h (about 450 Hv). That is, the pressing face 22c of the heater chip 22 and the second metal base 21h on the back of the second bonding part 21k substantially have the same hardness. This improves affinity between the heater chip 22 and the second metal base 21h compared with a case using a film of electroless nickel whose hardness greatly differs from the hardness of stainless steel (about 450 Hv).

The improved affinity between the heater chip 22 and the second metal base 21h increases heat conductivity to easily reflow the solder bump 20, thereby surely bonding the flexure 19 and jumper 21 (wiring connecting part 21c) together and manufacturing the head suspension 11.

The present invention is not limited to the above-mentioned embodiments. Various modifications of the embodiments will be possible based on teachings mentioned and suggested in the specification and claims without departing from the spirit of the present invention. Reflow bonding methods and head suspension manufacturing methods according to such modifications also fall in the scope of the present invention.

For example, the solder bump 20 that is arranged in the embodiments on the second bonding part 21k may be arranged on the first bonding part 19d, or on both of them.

What is claimed is:

1. A method of manufacturing a head suspension, the head suspension including a base, a load beam connected to the base, a first wiring member having a first metal base, a first insulating layer, and a first conductor layer that are sequentially layered one on another, and a second wiring member having a second metal base, a second insulating layer, and a second conductor layer that are sequentially layered one on another, the first wiring member having a first bonding part, the second wiring member having a second bonding part, the first and second bonding parts being bonded together by reflowing solder arranged on at least one of the first and second bonding parts, the manufacturing method comprising steps of:

positioning the first and second wiring members so that the first and second bonding parts face each other with the solder interposed between them; and heating and pressing the metal base behind one of the first and second bonding parts with a pressing face of a heater chip being coated with a nickel film so that the first and second bonding parts lie one on another and the solder is heated and reflows to bond the first and second wiring members together and;

wherein the first and second metal bases are made of stainless steel, and the hardness of the nickel film is substantially equal to that of the stainless steel.

2. The method of claim 1 wherein the nickel film is a film of electroless nickel.

3. The method of claim 1 wherein the nickel film is a composite plated film of electroless nickel with dispersed fluororesin particles.

4. The method of claim 1, wherein a hardness of the pressing face is set by the nickel film so that the hardness of the pressing face is substantially equal to a hardness of an area behind the one of the first and second bonding parts to be pressed by the pressing face.

5. The method of claim 4, wherein the nickel film is a film of electroless nickel.

6. The method of claim 4, wherein the nickel film is a composite plated film of electroless nickel with dispersed fluororesin particles.

* * * * *